United States Patent [19]

Brescia

[11] 4,394,668

[45] Jul. 19, 1983

[54] ELECTRONIC PRINTER

[75] Inventor: Riccardo Brescia, Ivrea, Italy

[73] Assignee: Ing. C. Olivetti & C., S.p.A., Italy

[21] Appl. No.: 298,790

[22] Filed: Sep. 2, 1981

[30] Foreign Application Priority Data

Sep. 22, 1980 [IT] Italy ........................ 68467 A/80

[51] Int. Cl.³ ........................ G01D 15/16; H01H 1/00

[52] U.S. Cl. ........................ 346/139 R; 335/213

[58] Field of Search ................ 346/139; 335/213, 220, 335/250, 282, 299

[56] References Cited

U.S. PATENT DOCUMENTS

| | | | |
|---|---|---|---|
| 2,907,623 | 10/1959 | Parenti | 346/139 R |
| 3,098,943 | 7/1963 | Reiches | 335/213 X |
| 3,146,056 | 8/1964 | Kampf | 346/139 R X |
| 3,310,764 | 3/1967 | Kilpatrick | 335/213 |
| 3,950,614 | 4/1976 | Anderson et al. | 346/139 C X |

*Primary Examiner*—Donald A. Griffin

*Attorney, Agent, or Firm*—Schuyler, Banner, Birch, McKie & Beckett

[57] ABSTRACT

The tracing element is carried by one vertex of an articulated parallelogram, of which the arms are constituted by thin steel or glass fibres associated with a plastics coating or matrix for damping vibrations. The arms are moved by servocontrols constituted by electromagnets with moving coils having a length less than the length of the corresponding magnet pole piece. The coils are formed from a conductor of square or rectangular cross-section in order to provide maximum packing for the turns.

10 Claims, 4 Drawing Figures

ELECTRONIC PRINTER

BACKGROUND OF THE INVENTION

This invention relates to an electronic printer with a single tracing element which is moved in accordance with two coordinates parallel to the printing plane by means controlled by recorded numerical instructions.

Printers of the aforesaid types are known in which the tracing element is carried by a small sheet metal or plastics frame comprising two arms connected to two electromagnet coils which are movable perpendicularly to each other. In such printers the movable assembly has a certain mass and rigidity which limits the printing speed.

SUMMARY OF THE INVENTION

According to the invention, I now provide an electronic printer comprising a tracing element carried at one vertex of an articulated parallelogram, and actuating means responsive to electrical signals to distort the parallelogram so as to move the tracing element in two coordinate directions parallel to the printing plane, at least two of the arms of the parallelogram being constituted by thin fibres of elastic material, the articulated joints of the parallelogram being constituted by the end portions of the arms.

BRIEF DESCRIPTION OF THE DRAWINGS

The invention will be described in more detail by way of example, with reference to the accompanying drawings, in which.

DESCRIPTION OF THE PREFERRED EMBODIMENTS

Figure 2:
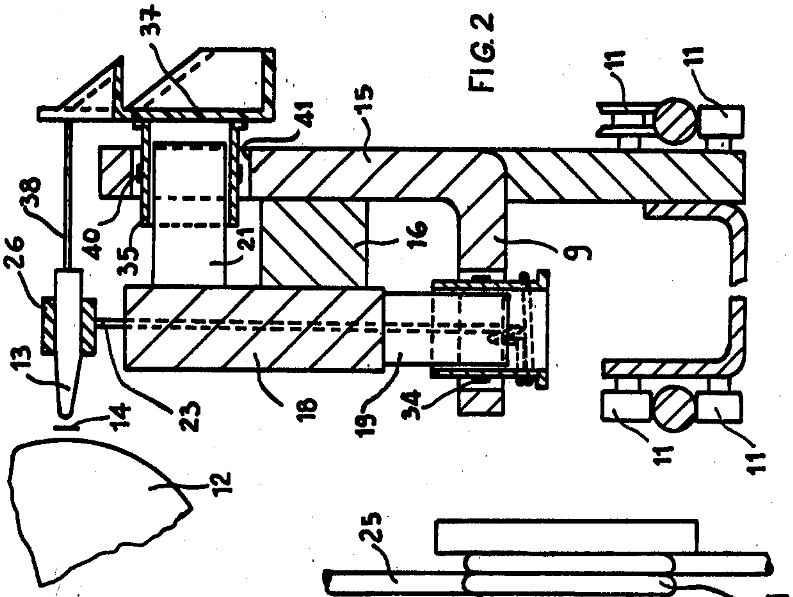
FIG. 2 is a partial side section on the line II—II of FIG. 1.

The printer is mounted on a carriage 10 which slides in front of a platen 12 (FIG. 2) on rollers 11.

Figure 1:
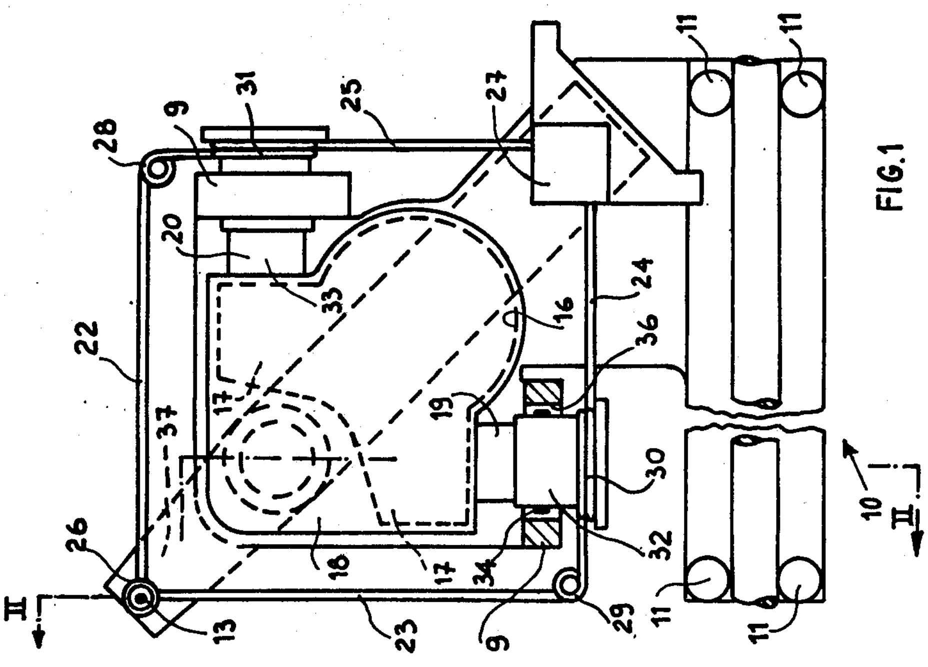
FIG. 1 is a partial front view of a printer comprising a single tracing element, according to the invention.

The printer comprises a printing stylus 13 arranged for movement along two coordinate axes X and Y in the plane of the paper, in order to trace the character, and along an axis Z in order to move against the paper and exert a variable pressure on the paper by way of an inked ribbon 14. A permanent magnet 16 of substantially cylindrical shape with two prismatic lobes 17 (FIG. 1) is fixed on a steel plate 15 carried by the carriage 19 and comprising two flanges 9 perpendicular to each other. On the magnet 16 there is fixed a second steel plate 18 on which two cylindrical magnetic cores 19 and 20 are fixed with their axis directed along the X axis and Y axis respectively. A third cylindrical magnetic core 21 (FIG. 2) is also fixed on the plate 18 and has its axis directed along the Z axis.

The printing stylus 13 is carried by a vertex of an articulated parallelogram constituted by two arms 22 and 23 (FIG. 1) converging at the vertex comprising the stylus 13, and by two arms 24 and 25 converging at the opposite vertex. The four arms 22–25 are formed from thin fibres of elastic material, in particular thin steel wires having a diameter of 0.4 mm, or bars of equivalent rectangular cross-section. The arms 22 and 23 are fixed to a guide tube 26 (FIG. 2) for the stylus 13. The arms 24 and 25 are fixed to a block 27 (FIG. 1) fixed to the plate 15.

The arms 22 and 25 and the arms 23 and 24 are in the form of a single piece of steel wire which, at the other two vertices of the quadrilateal, are wound into a turn 28, 29 respectively, which constitute two articulated joints of the quadrilateral. The arms 22–25 are elastically flexible, in such a manner as to always return the quadrilateral and thus the printing point 13 into the position of FIG. 1, when the controlled movement action ceases. It is therefore apparent that the articulated joints of the quadrilateral are constituted by the end portions of the arms 22–25. Each of the two arms 24 and 25 forms a winding 30, 31 consisting of one and a half turns such that the arms 24 and 25 are disposed in a diametrical direction relative to the windings 30, 31. Two corresponding sleeves 32, 33 of insulating material are fixed on to these, for example by cementing, and are disposed coaxially to the corresponding cores 19,20. On each sleeve 32, 38 there is wound an electric coil 34, 35 passing through a corresponding bore 36 in the corresponding flange 9 of the plate 15, so that the coils 34 and 35 are mobile relative to the fixed cores 19 and 20.

Figure 4:
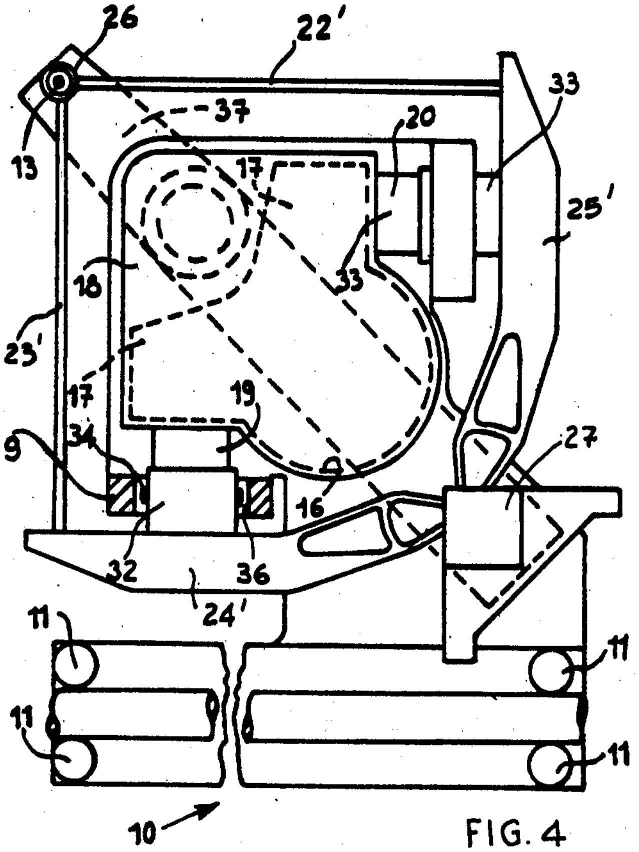
FIG. 4 is a front view of a modification of the printer.

According to one modification of the printer, the arms 24 and 25 of steel wire are replaced by two plastics strips 24′ and 25′ (FIG. 4) elastically hinged to the block 27. On to each strip 24′ and 25′ there is fixed the corresponding sleeve 32, 33 and a steel wire 22′ and 23′, which is fixed in its turn to the guide tube 26. The strips 24′ and 25′ have the advantage of greater rigidity in a direction parallel to the printing point 13, without increasing the weight of the movable assembly.

The coils 34 and 35 are variably energised by means of a feed-back system, from a pair of power amplifiers, on the basis of instructions provided by a character generating memory. These instructions are processed by a central unit not shown on the drawings, in the manner described in our British Pat. No. 1,569,820. The coils 34 and 35 then move axially along the corresponding cores 19, 20 together with the corresponding sleeve 32, 33, thus causing the corresponding arm 24, 25 to rotate. The movements of the two arms 24 and 25 are transmitted by the two arms 23 and 22 to the printing stylus 13, so causing this latter to move in the X, Y plane.

In order to exclude the resonance frequencies of the arms 22–25 constructed of steel wire, this wire can be coated with a damping plastics layer. Alternatively, the arms 22–25 can be constituted by thin glass or carbon fibres embedded in a plastics matrix having a weight less than or equal to that of the coated steel wire. The purpose of the matrix is to bond the glass fibres. Such fibres have an intrinsic damping characteristic similar to that of the coated steel.

The movable assembly of the printing stylus 13, i.e. the assembly consisting of the parallelogram and the point, has a weight of about 1.4 g and represents a reduction of about 35% of the weight of a similar movable assembly having equal sides but of sheet metal or plastics construction as in the case of known printers. The elastic rigidity of the quadrilateral is about 35 g/mm representing a reduction of 60% with respect to the known printers. Finally, the elastic effect induced between the X axis and Y axis movements is drastically reduced. This reduction leads to a significant reduction of at least 35% in the current required by the servo-controls and in the heat generated by the coils. This in its turn gives a considerable power margin for increasing the printing velocity. It has been experimentally that if the velocity vector is increased by 50% with respect to a reference vector, the power amplifiers for the servo-mechanism still do not become saturated, and the coil heating remains below the maximum allowable rated value.

On the plate 15 (FIG. 2) there is also fixed one end of an arm 37, the other end of which is fixed by a strut 38 to the printing stylus 13. On the arm 37 there is fixed a sleeve 39 coaxial to the core 21, and on which there is wound a third moving coil 40 which passes freely through a further bore 41 in the plate 15. When the coil 40 is variably energised, it moves axially relative to the core 21 together with the sleeve 39, so deflecting the arm 37 which causes the printing stylus 13 to make contact with the inked ribbon 14 and the paper, so tracing a sign of variable thickness. The magnetic flux required by the three moving coils 34, 35 and 40 is created by the single permanent magnet 16 and, both by way of the plate 18 and the cores 19, 20 and 21 (FIG. 1) of the three coils and by way of the steel plate 15, creates a magnetic field in the air gap between each bore 36 and the cores 19 and 20 and between the bore 41 and the core 21, the flux of which is a maximum at the pole pieces constituted by the inner surface of the bores 36 and 41.

Figure 3:
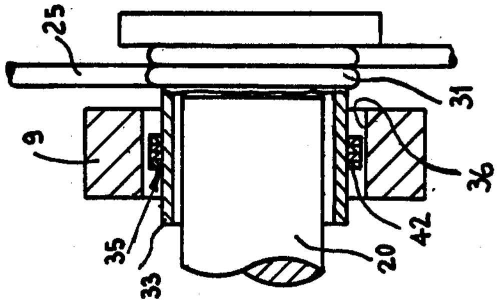
FIG. 3 is an enlarged diagrammatic section through a detail of FIG. 2.

In order to further reduce heating of the coils 34, 35 and 40, the length of each coil is less than the length of the pole piece, i.e. of the thickness of the plate 15, so that even following any movement it is always immersed in the magnetic flux. Advantageously, the coil length can be chosen equal to one third the length of the pole piece. The coil 35 is shown by way of example in FIG. 3. In this manner each turn of the entire coil effectively generates a component of the total force, even if part of the flux remains inactive. In known moving coil electromagnets, in which the coil length is greater than the pole piece, the turns which are located even temporarily outside the magnetic flux of the pole piece do not generate forces, but because of the fact that they are energised they generate heat. For equal forces generated, a short coil as heretofore described has a smaller mass in movement, generates less heat and has a smaller time constant than a long coil. The fact that it requires a larger magnet which is not always totally utilised does not influence the velocity of the servo-mechanism as this is a fixed part. Finally, in order to further reduce the heating of the coils 34, 35 and 40, the windings can be made with a conductor 42 (FIG. 3) of square or rectangular cross-section. This reduces the electrical resistance of each winding by at least 25% and with only a small increase in the total mass of the moving assembly, but this does not substantially reduce the advantage obtained.

Modifications and additions can be made to the printer improvements heretofore described without leaving the scope of the invention as claimed. For example, the winding of the conductor 42 (FIG. 3) can have two or more layers of turns instead of a single layer.

I claim:

1. An electronic printer comprising a tracing element carried at one vertex of an articulated parallelogram, and actuating means responsive to electrical signals to distort the parallelogram so as to move the tracing element in two coordinate directions parallel to the printing plane, at least two of the arms of the parallelogram being constituted by thin fibres of elastic material, the articulated joints of the parallelogram being constituted by the end portions of the arms.

2. Printer as claimed in claim 1, wherein the fibres are steel wires or bars.

3. Printer as claimed in claim 2, wherein each of two pairs of the four arms of the parallelogram is constituted by one wire or bar, the articulated joint between the arms of each pair being constituted by a turn of the steel wire or bar.

4. Printer as claimed in claim 2 or 3, wherein the wire or bar is coated by a plastics layer in order to damp vibrations.

5. Printer as claimed in claim 1, wherein the fibres are of glass or carbon and are embedded in a plastics matrix which performs a bonding and damping function.

6. Printer as claimed in claim 1, wherein the fibres have a diameter less than 1 mm and the parallelogram has a weight less than 2 grams.

7. Printer as claimed in claim 1, in which the actuating means comprise two electromagnets with moving coils attached to two arms respectively of the parallelogram.

8. Printer as claimed in claim 7, wherein each coil is formed from a conductor of square or rectangular cross-section.

9. Printer as claimed in claim 7 or 8, wherein the length of the coil is less than the length of at least one cooperating pole pieces, such that when in any position the coil always remains immersed in the magnetic flux of the corresponding air gap.

10. Printer as claimed in claim 9, in which the pole piece is constituted by a metal support plate for the parallelogram, and wherein the length of the coil is substantially one third of the thickness of the plate.

* * * * *